(12) United States Patent
Flake et al.

(10) Patent No.: US 7,909,238 B2
(45) Date of Patent: Mar. 22, 2011

(54) USER-CREATED TRADE CARDS

(75) Inventors: Gary W. Flake, Bellevue, WA (US);
Blaise H. Aguera, Seattle, WA (US);
Brett D. Brewer, Sammamish, WA (US); Steven Drucker, Bellevue, WA (US); Karim Farouki, Seattle, WA (US);
Stephen L. Lawler, Redmond, WA (US); Donald James Lindsay, Mountain View, CA (US); Adam Sheppard, Seattle, WA (US); Richard Stephen Szeliski, Bellevue, WA (US); Julio Estrada, Medina, WA (US);
Christopher B. Weare, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/962,700

(22) Filed: Dec. 21, 2007

(65) Prior Publication Data
US 2009/0159656 A1    Jun. 25, 2009

(51) Int. Cl.
*G06F 17/00* (2006.01)
(52) U.S. Cl. ..................... 235/375; 235/431
(58) Field of Classification Search ............ 235/375, 235/431, 495; 707/6, 203; 715/201, 221, 715/234, 243–255, 277
See application file for complete search history.

(56) References Cited

U.S. PATENT DOCUMENTS

| | | | |
|---|---|---|---|
| 5,095,798 A | 3/1992 | Okada et al. | |
| 5,640,565 A * | 6/1997 | Dickinson | 707/103 R |
| 6,128,599 A | 10/2000 | Walker et al. | |
| 6,473,760 B1 * | 10/2002 | Klatt et al. | 707/10 |
| 6,591,250 B1 | 7/2003 | Johnson et al. | |
| 6,612,501 B1 | 9/2003 | Woll et al. | |
| 6,848,997 B1 * | 2/2005 | Hashimoto et al. | 463/42 |
| 6,883,000 B1 | 4/2005 | Gropper | |
| 7,042,455 B2 | 5/2006 | Arcas | |
| 7,075,535 B2 | 7/2006 | Arcas | |
| 7,133,054 B2 | 11/2006 | Arcas | |
| 2002/0032696 A1 | 3/2002 | Takiguchi et al. | |
| 2002/0042744 A1 | 4/2002 | Kohl | |
| 2003/0004887 A1 | 1/2003 | Roszak | |
| 2003/0061097 A1 | 3/2003 | Walker et al. | |
| 2003/0178482 A1 | 9/2003 | Kisliakov | |
| 2005/0270288 A1 | 12/2005 | Arcas | |
| 2006/0005146 A1 | 1/2006 | Arcas | |

(Continued)

FOREIGN PATENT DOCUMENTS

| | | |
|---|---|---|
| KR | 20020004379 A | 1/2002 |
| WO | WO 2007/058743 A1 | 5/2007 |
| WO | 2009082589 A3 | 7/2009 |

OTHER PUBLICATIONS

OA dated Aug. 17, 2009 for U.S. Appl. No. 11/958,616, 28 pages.
International Search Report dated Jul. 17, 2009 for PCT Application Serial No. 2008/084664, 2 pages.

(Continued)

*Primary Examiner* — Thien M Le
(74) *Attorney, Agent, or Firm* — Turocy & Watson, LLP

(57) ABSTRACT

The claimed subject matter provides a system and/or a method that facilitates identifying relationships between two or more trade cards. A schema component can implement a portion of user-assisted schema to create a trade card that represents a distillation of a document with document-specific data. A relationship component can identify at least one of a hard link or a soft link associated with the trade card in connection with at least one of a network or one or more trade cards, wherein the hard link is a source that derived the trade card and the soft link is directed toward a disparate trade card with a portion of substantially similar document-specific data.

18 Claims, 10 Drawing Sheets

U.S. PATENT DOCUMENTS

| | | | |
|---|---|---|---|
| 2006/0038823 | A1 | 2/2006 | Arcas |
| 2006/0176305 | A1 | 8/2006 | Arcas et al. |
| 2006/0212805 | A1* | 9/2006 | Allen et al. .................. 715/520 |
| 2006/0235941 | A1 | 10/2006 | Arcas et al. |
| 2006/0293904 | A1* | 12/2006 | Ramanathan et al. ............ 705/1 |
| 2007/0147892 | A1 | 6/2007 | Tomatsu et al. |
| 2008/0235276 | A1 | 9/2008 | Erol et al. |
| 2009/0054124 | A1 | 2/2009 | Robbers et al. |

OTHER PUBLICATIONS

OA dated Apr. 19, 2010 for U.S. Appl. No. 11/958,616, 31 pages.
ESR dated Nov. 16, 2010 for European Patent Application No. EP 08 86 3453, 10 pages.
OA dated Oct. 15, 2010 for U.S. Appl. No. 11/958,616, 39 pages.
OA dated Dec. 22, 2010 for U.S. Appl. No. 11/966,525, 10 pages.

* cited by examiner

USER-CREATED TRADE CARDS

CROSS REFERENCE TO RELATED APPLICATION(S)

This application relates to U.S. patent application Ser. No. 11/966,525 filed on Dec. 28, 2007, entitled "MULTI-SCALED TRADE CARDS," and U.S. patent application Ser. No. 11/958,616 filed on Dec. 18, 2007, entitled "TRADE CARD SERVICES." The entireties of such applications are incorporated herein by reference.

BACKGROUND

Technological advances in computer hardware, software and networking have lead to efficient, cost effective computing systems (e.g., desktop computers, laptops, handhelds, cell phones, servers . . . ) that can communicate with each other from essentially anywhere in the world in order to exchange information. These systems continue to evolve into more reliable, robust and user-friendly systems. As a consequence, more and more industries and consumers are purchasing computers and utilizing them as viable electronic alternatives to traditional paper and verbal media for exchanging information. For example, many industries and consumers are leveraging computing technology to improve efficiency and decrease cost through web-based (e.g., on-line) services. For instance, consumers can search and retrieve particular information (e.g., via a search engine), purchase goods, view bank statements, invoke monetary transactions (e.g., pay a bill on-line), research products and companies, apply for employment, obtain real-time stock quotes, obtain a college degree, obtain news, access entertainment (e.g., video, music, programming), download files and applications, transmit correspondence (e.g., email, chat rooms, etc.), and the like with the click of a mouse.

In light of such technological advances, an immense amount of data can be generated and/or associated with computer hardware, software, and networking. With the current trend of being connected and/or available for various communications with electronic devices (e.g., mobile devices, personal computers, etc.) there can be generous amount of data associated and utilized therewith. In general, the presentation and organization of data (e.g., the Internet, local data, remote data, websites, etc.) is a crucial factor for a user to have an enjoyable browsing experience. For instance, a website with data aesthetically placed and organized tends to have increased traffic in comparison to a website with data chaotically or randomly displayed. Moreover, interaction capabilities with data can influence a browsing experience. For example, typical browsing or viewing data is dependent upon a defined rigid space and real estate (e.g., a display screen) with limited interaction such as selecting, clicking, scrolling, and the like. Yet, organization, presentation, and interaction with data have had little advancements or improvements which can tend to hinder a user's browsing experience.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate creating a trade card that summarizes a portion of data and identifies affiliations of the trade card. A trade card can be a distillation of a document that summarizes essential information. For example, a trade card of a web page can include key phrases, dominant images, spec information (e.g., price, details, etc.), etc. A relationship component can identify direct (e.g., hard link) and indirect (e.g., a soft link) relationships between trade cards. Various documents and information associated with trade cards can be evaluated in order to accumulate a trade card database illustrating data relationships that are implicit. For instance, a hard link (e.g., a direct relationship) can refer to a source that derived the trade card (e.g., hyperlink, website, etc.), whereas a soft link (e.g., an indirect relationship) can refer to a substantially similar trade card (e.g., trade card A is similar to trade card B).

Moreover, the trade cards can be user-created. A schema component can employ a user-assisted schema that can create a trade card automatically (e.g., performed by entity extraction, etc.) or semi-automatically (e.g., preformed by entity extraction coupled with user guidance). In another aspect of the subject innovation, the trade cards can be vetted and ranked by a community (e.g., social network, website, etc.). Such vetting or ranking can be used as search criteria in order to query trade cards. In other aspects of the claimed subject matter, methods are provided that facilitate identifying relationships for a trade card created with a portion of user-assisted schema.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
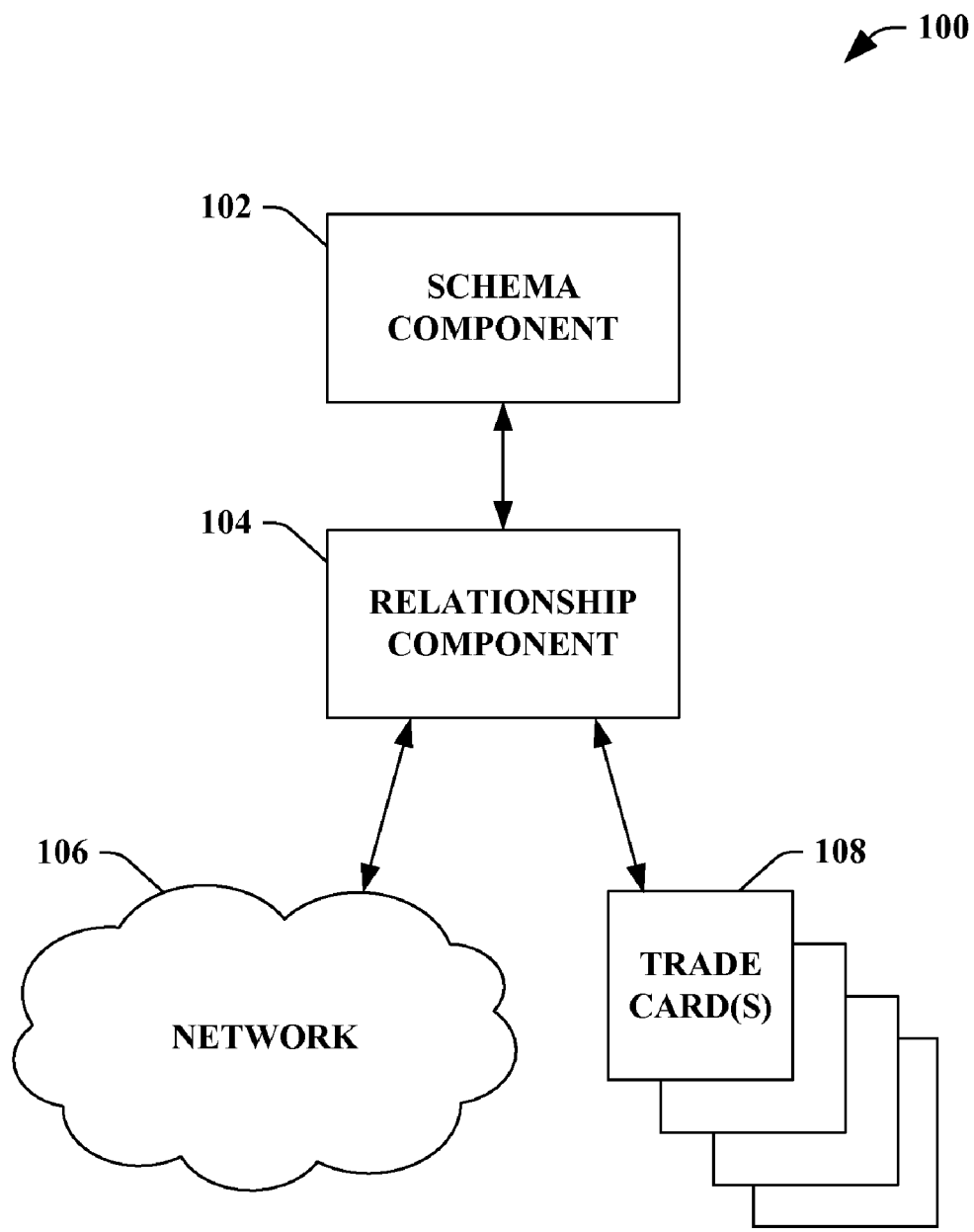
FIG. 1 illustrates a block diagram of an exemplary system that facilitates creating a trade card that summarizes a portion of data and identifying affiliations of the trade card.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "engine," "network," "environment," "aggregator," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

It is to be appreciated that the subject innovation can be utilized with at least one of a display engine, a browsing engine, a content aggregator, and/or any suitable combination thereof. A "display engine" can refer to a resource (e.g., hardware, software, and/or any combination thereof) that enables seamless panning and/or zooming within an environment in multiple scales, resolutions, and/or levels of detail, wherein detail can be related to a number of pixels dedicated to a particular object or feature that carry unique information. In accordance therewith, the term "resolution" is generally intended to mean a number of pixels assigned to an object, detail, or feature of a displayed image and/or a number of pixels displayed using unique logical image data. Thus, conventional forms of changing resolution that merely assign more or fewer pixels to the same amount of image data can be readily distinguished. Moreover, the display engine can create space volume within the environment based on zooming out from a perspective view or reduce space volume within the environment based on zooming in from a perspective view. Furthermore, a "browsing engine" can refer to a resource (e.g., hardware, software, and/or any suitable combination thereof) that employs seamless panning and/or zooming at multiple scales with various resolutions for data associated with an environment, wherein the environment is at least one of the Internet, a network, a server, a website, a web page, and/or a portion of the Internet (e.g., data, audio, video, text, image, etc.). Additionally, a "content aggregator" can collect two-dimensional data (e.g., media data, images, video, photographs, metadata, etc.) to create a three dimensional (3D) virtual environment that can be explored (e.g., browsing, viewing, and/or roaming such content and each perspective of the collected content).

Now turning to the figures, FIG. 1 illustrates a system 100 that facilitates creating a trade card that summarizes a portion of data and identifies affiliations of the trade card. The system 100 can include a schema component 102 that can automatically generate a trade card 108 utilizing a portion of user-assisted schema, wherein the trade card 108 can be a distillation of a document that summarizes essential and/or important information. The schema component 102 can employ a portion of schema that can create the trade card 108 automatically, semi-automatically, and/or any suitable combination thereof. The system 100 can further include a relationship component 104 that can identify relationships to the trade card 108 (e.g., the user-created trade card, any suitable trade card, etc.). In particular, the relationship component 104 can evaluate any suitable data related to the trade card 108 and/or a network 106 in order to locate implicit, explicit, direct, indirect, hard link, soft link, etc. relationships and/or affiliations. For instance, a hard link (e.g., a direct relationship) can refer to a source that derived the trade card (e.g., hyperlink, website, etc.), whereas a soft link (e.g., an indirect relationship) can refer to a substantially similar trade card (e.g., trade card A includes information or metadata that relates to metadata or information included on trade card B). Generally, the relationship component 104 can locate sources (related to the network 106) that derived a trade card such as an entity (e.g., a corporation, a business, a user, a company, a machine, a website, a web page, etc.) as well as any other trade cards with substantially similar or correlating data (e.g., user-created trade cards, trade cards associated with the Internet, trade cards within the network 106, etc.).

Generally, the trade card 108 can be a summarization of a portion of data. For instance, a trade card can be a summarization of a web page in which the trade card can include key phrases, dominant images, spec information (e.g., price, details, etc.), contact information, etc. Thus, the trade card is a summarization of important, essential, and/or key aspects and/or data of the web page. Moreover, it is to be appreciated that the trade card 108 can include any suitable data determined to be essential for the distillation of content (e.g., a document) such as static data, active data, and/or any suitable combination thereof. For example, the trade card 108 can include an image, a portion of text, a gadget, an applet, a real time data feed, etc. The trade card 108 can further be utilized in any suitable environment, in any suitable platform, on any suitable device, etc. In other words, the trade card 108 can be universally compatible with any suitable environment, platform, device, etc. such as a desktop computer, a component, a machine, a machine with a windows-based operating system, a media device, a portable media player, a cellular device, a portable digital assistant (PDA), a gaming device, a laptop, a web-browsing device regardless of operating system, a gaming console, a portable gaming device, a mobile device, a portion of hardware, a portion of software, a smartphone, a wireless device, a third-party service, etc. In another example, the trade card 108 can display particular information based at least in part upon an environment utilizing such trade card or a user or machine utilizing the trade card. In other words, the trade card 108 can be granular and include various sections or portions of data, wherein such granularity or portion of data can be displayed based upon a user or machine utilizing such trade card.

For instance, a user can create a trade card representative of a particular service or product, wherein the trade card can be a distillation of product or service specific data. The trade card, for example, can include various data such as important images, specification information (e.g., size, weight, color, material composition, etc.), cost, vendors, make, model, version, and/or any other information the user includes into the trade card. In other words, the trade card can be a summarization of product or service data in which the summarization data is selected by the user. The subject innovation can enable the user with a user-assisted schema that can automatically or semi-automatically create the trade card associated with the product or service. The schema can allow the user to identify or select portions of data that can be aggregated or utilized to generate a trade card. The trade card can further be created to include various links, relationships, and/or affiliations that can be automatically and dynamically identified by the claimed subject matter, in which the relationship, links, and/or affiliations can be with at least one of the Internet, a disparate trade card, the network 106, a server, a host, and/or any other suitable environment associated with a trade card. For instance, the user can include a hard link (e.g., reflective of a source or direct source that derived the trade card, etc.) or a soft link (e.g., a relationship to a disparate trade card with substantially similar data, etc.). In this example, a direct or hard link can be at least one of a maker of the product or service, a vendor of the product or service, or the user that created the trade card. Moreover, an indirect or soft link can be a trade card created or generated by a disparate entity (e.g., company, enterprise, user, machine, business, group of users, etc.) that includes information associated with the specific product or service.

In addition, the system 100 can include any suitable and/or necessary interface component (not shown), which provides various adapters, connectors, channels, communication paths, etc. to integrate at least one of the schema component 102 or the relationship component 104 into virtually any operating and/or database system(s) and/or with one another. In addition, the interface component can provide various adapters, connectors, channels, communication paths, etc., that provide for interaction with network 106, the trade card 108, and any other device and/or component associated with the system 100.

Figure 2:
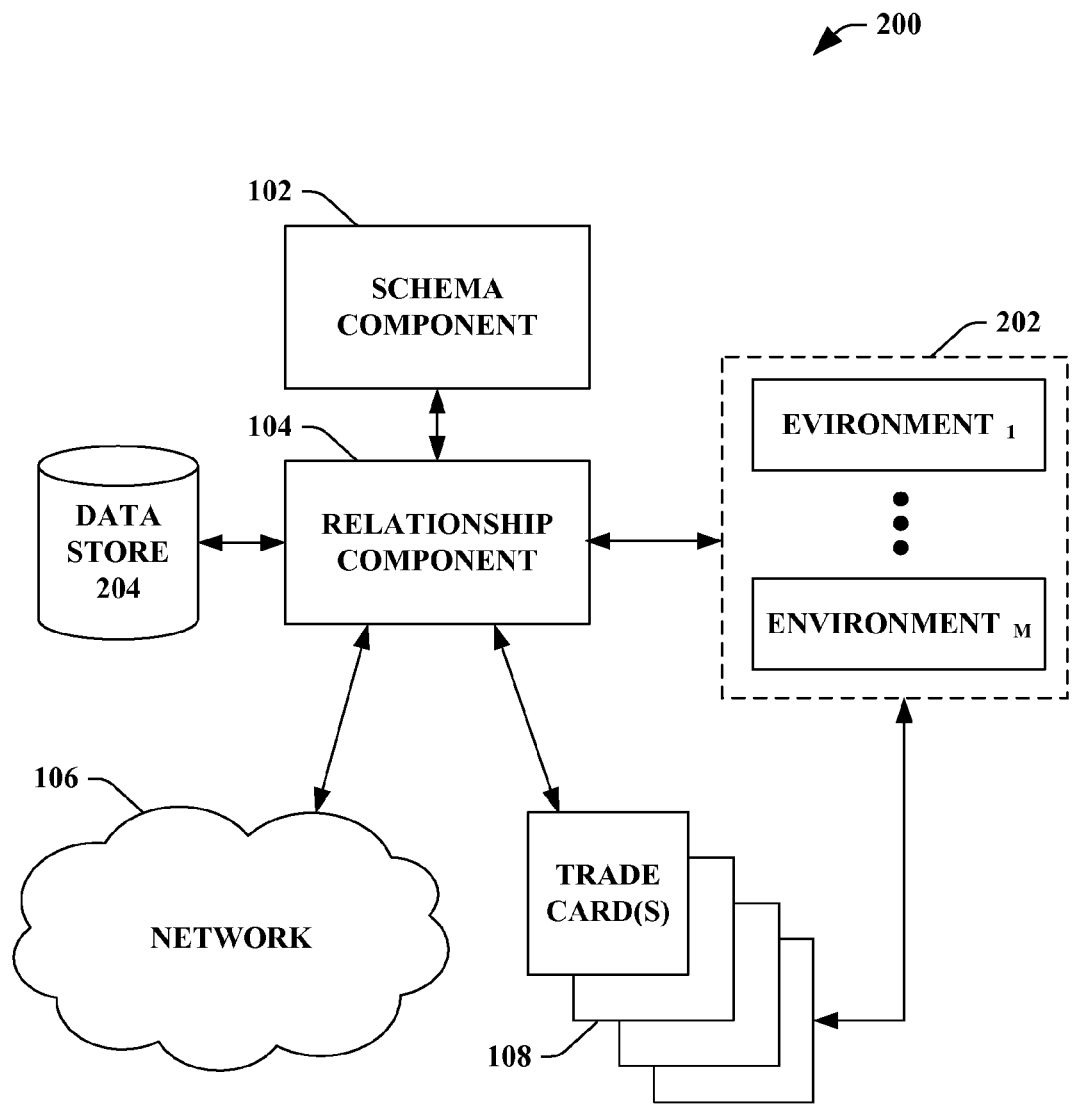
FIG. 2 illustrates a block diagram of an exemplary system that facilitates utilizing a user-created trade card seamlessly across various environments.

FIG. 2 illustrates a system 200 that facilitates utilizing a user-created trade card seamlessly across various environments. The system 200 can include the schema component 102 that provides a portion of schema to create a trade card representative of a summarization or distillation of data. The distillation or summarization of data can be for any suitable content such as, but not limited to, a document, an item such as, a website, a good, a service, a user, a network, a company, an enterprise, a home, a group of users, etc. Moreover, it is to be appreciated that the portion of schema provided by the schema component 102 can generate the trade card 108 with various features and/or settings. In general, the schema can provide automatic or semi-automatic assistance (with or without user-review) for at least one of aesthetic characteristics (e.g., layout, font, size, format, etc.), populated data (e.g., graphics, text, imagery, video, audio, web links, websites, etc.), derived source data (e.g., editorial experiences, expansion data, etc.), resolution data (e.g., scale and corresponding resolution, available views, etc.), relationships (e.g., direct links, indirect links, etc.), security settings (e.g., permissions for viewing, etc.), display settings (e.g., configuration for data to display based on target or host environment, display settings for portion of a trade card based on user or machine utilizing such trade card, etc.), and/or any other suitable data associated with creating a trade card as discussed in the subject innovation.

Furthermore, the system 200 can include the relationship component 104 that can dynamically discover affiliations or relationships related to a trade card, wherein the trade card can be user-created, schema-created, and/or any other trade card. The relationship component 104 can evaluate any suitable portion of the trade card 108 and/or metadata associated therewith in order to identify hard links (e.g., direct links, explicit relationships, etc.) and/or soft links (e.g., indirect links, implicit relationships, etc.) in connection with a disparate trade card and/or the network 106. For instance, a trade card can be evaluated in which related trade cards can be identified (e.g., soft links). Moreover, a trade card can be examined to locate hard links such as a derived source associated with the network or a disparate trade card. In an aspect in connection with the claimed subject matter, the system 200 can accumulate relationships (e.g., indirect, direct, etc.) in order to populate a trade card data store.

It is to be appreciated that at least one of the schema component 102, the relationship component 104, and/or the trade card 108 can be utilized with any suitable environment 202. In particular, the trade card 108 can be compatible with a plurality of environments 202 independent of respective operating systems, platforms, formats, etc. For instance, there can be any suitable number of environments 202 such as environment $_1$ to environment $_M$, where M is a positive integer. The environment can be, but is not limited to, a desktop computer, a component, a machine, a machine with a windows-based operating system, a media device, a portable media player, a cellular device, a portable digital assistant (PDA), a gaming device, a laptop, a web-browsing device regardless of operating system, a gaming console, a portable gaming device, a mobile device, a portion of hardware, a portion of software, a smartphone, a wireless device, a third-party service, etc. Furthermore, it is to be appreciated that a portion of the trade card 108 can be exposed or surfaced based at least in part upon the environment 202 in which the trade card is being utilized. For example, a portion of a trade card (e.g., an online gaming portion) can be available for an online gaming community for a gaming console, whereas such portion can be non-available on a desktop machine within a social network or environment.

The system 200 can further include a data store 204 that can include any suitable data related to the schema component 102, the relationship component 104, the network 106, the trade card 108, etc. For example, the data store 204 can include, but not limited to including, a trade card, data incorporated into a trade card, available data to include with a trade card (e.g., a portion of a graphic, a portion of audio, a portion of video, a portion of text, a web link, a web page, a website, an applet, a gadget, a real time feed, etc.), a portion of schema to assist in creating a trade card, a relationship associated with a trade card, a direct link, a hard link, an indirect link, a soft link, a syndication of a trade card (e.g., described in more detail below), search criteria, metadata associated with a trade card, user settings, user configurations, trade card settings or data (e.g., expansion data, editorial experience data, links, host location, security settings, exposure settings, etc.), and/or any other suitable data related to the system 200.

It is to be appreciated that the data store 204 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 204 of the subject systems and methods is intended to comprise, without being limited to, these and any other suitable types of memory. In addition, it is to be appreciated that the data store 204 can be a server, a database, a hard drive, a pen drive, an external hard drive, a portable hard drive, and the like.

Figure 3:
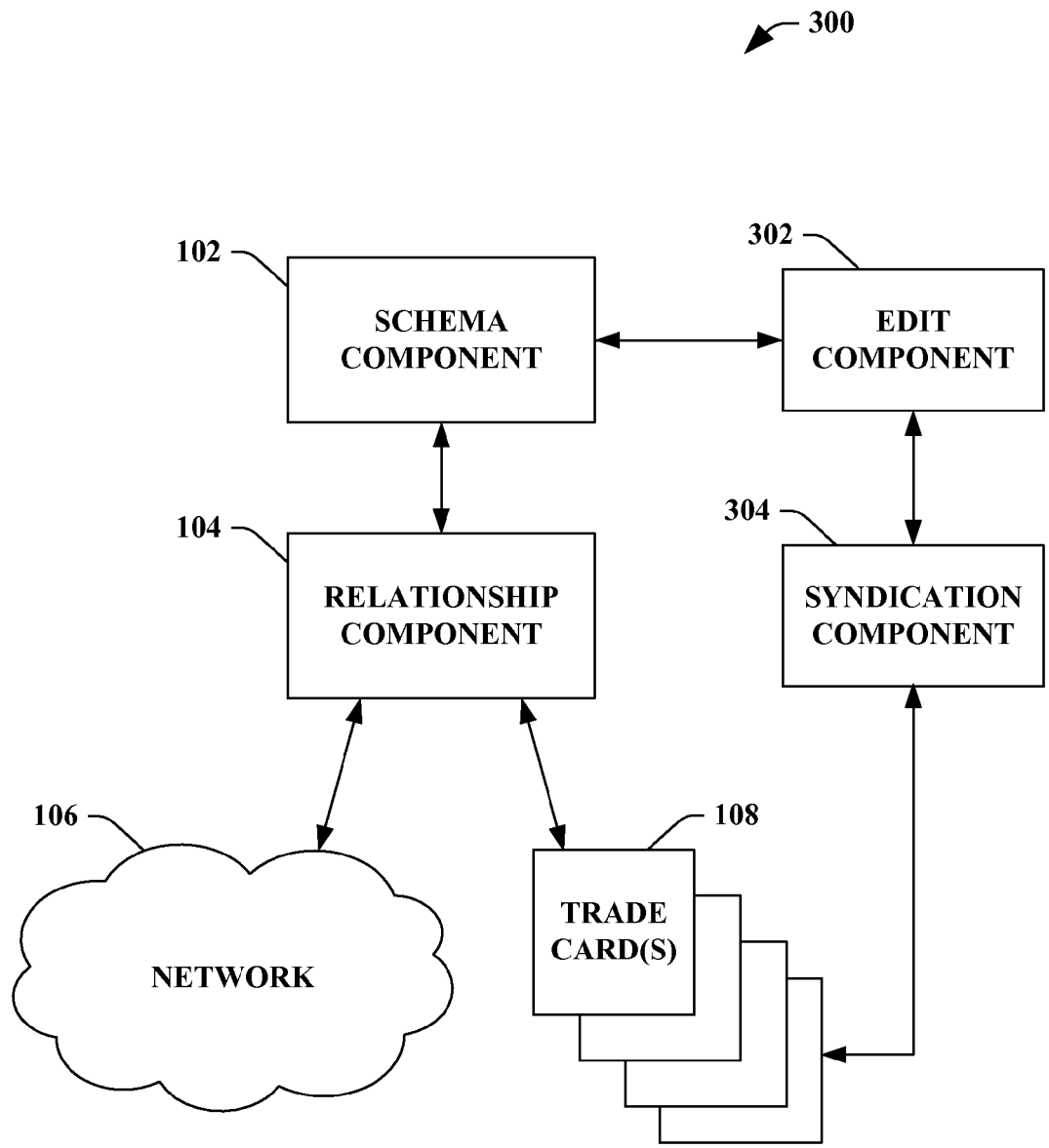
FIG. 3 illustrates a block diagram of an exemplary system that facilitates incorporating features into a trade card based upon a user preference.

FIG. 3 illustrates a system 300 that facilitates incorporating features into a trade card based upon a user preference. The system 300 can facilitate creating a trade card utilizing a portion of schema provided by the schema component 102. The system 300 can further include the relationship component 104 that can evaluate a trade card in order to aggregate related links, associations, and/or affiliations. For instance, the relationship component 102 can evaluate a portion of the trade card to identify at least one of a source from the network 106 of the trade card or a related trade card with substantially similar data or content, wherein the source or the related trade card can be associated with the network 106.

The schema component 102 can utilize an edit component 302 to create a trade card. In particular, the schema component 102 can provide a portion of schema to automatically create a trade card and the edit component 302 can be utilized to edit or manipulate such trade card created. For example, the edit component 302 can be leveraged by a user in order to employ user-defined preferences, features, characteristics, or settings to an automatically created trade card. The edit component 302 can allow implementation of various settings or features for a trade card such as, but not limited to, available data to include with a trade card (e.g., a portion of a graphic, a portion of audio, a portion of video, a portion of text, a web link, a web page, a website, an applet, a gadget, a real time feed, etc.), a syndication of a trade card (e.g., described in more detail below), trade card settings or data (e.g., expansion data, editorial experience data, links, security, etc.), spec information, sources, host location, aesthetic characteristics (e.g., layout, font, size, format, etc.), resolution data (e.g., scale and corresponding resolution, available views, etc.), relationships, display or exposure settings (e.g., configuration for data to display based on target or host environment, display settings for portion of a trade card based on user or machine utilizing such trade card, etc.), and the like.

In one example, a trade card can be created with an editorial experience that can be any suitable collection of data gathered based upon a creator of the particular trade card (e.g., utilizing the edit component 302). For instance, the editorial experience can be any suitable portion of audio, text, graphic, or video that a creator aggregates in order portray his or her thoughts related to the created trade card. In one example, a trade card for a product can include an editorial experience that is a video of a creator using such product. In another example, a trade card created by a disparate user for the product can include an editorial experience that is a website for the creator or product. It is to be appreciated that the editorial experience can be any suitable data selected by a creator or originator of such trade card. Moreover, the editorial experience can correlate to the particular environment that the trade card is utilized. Thus, a first editorial exposure for a trade card can be employed for a first environment and a second editorial exposure for the trade card can be employed in a second environment.

As discussed, a portion of the trade card can be exposed or displayed based at least in part upon the environment in which the trade card is utilized. For example, a portion of the trade card can be viewable or usable on a mobile device, wherein such portion may not be available on a laptop device. In addition, various security settings can be employed in terms of access for each environment. In other words, a portion of a trade card can be accessible to a close friend but not a stranger in a particular environment (e.g., network, device, server, etc.). Such exposure and/or security settings can be manipulated or edited by the edit component 302.

In one example, the edit component 302 can be employed to identify a type of trade card to create or a template in which the schema component 102 can utilize such information to automatically create such type of trade card. Moreover, the trade card automatically created can still be edited by the user utilizing the edit component 302. For instance, a trade card type can be any suitable topic, category, or subject related to a summarization of data for such trade card. For example, if a trade card for a music album were to be created, the type or template of trade card can be a music type or template trade card having particular features, details, characteristics, layout, fonts, images, etc. related to such type (emphasizing particular details related to the specific type of trade card).

The edit component 302 can utilize a syndication component 304 that enables a portion of a trade card to be syndicated (e.g., web syndication, etc.). For instance, web syndication can be a web feed to various entities such as, but not limited to, a website, a disparate trade card, a network, a server, a user, a web address, an email address, a device (e.g., mobile device, gaming device, etc.), and/or any other suitable host or environment that can utilize a portion of the trade card. It is to be appreciated that the syndication can be included into the portion of schema that automatically creates a trade card. In addition, the syndication component 304 can be utilized by a user to configure syndication details or settings. The syndication component 304 can further enable a granular-type syndication, wherein portions of the trade card can be utilized for syndication.

Figure 4:
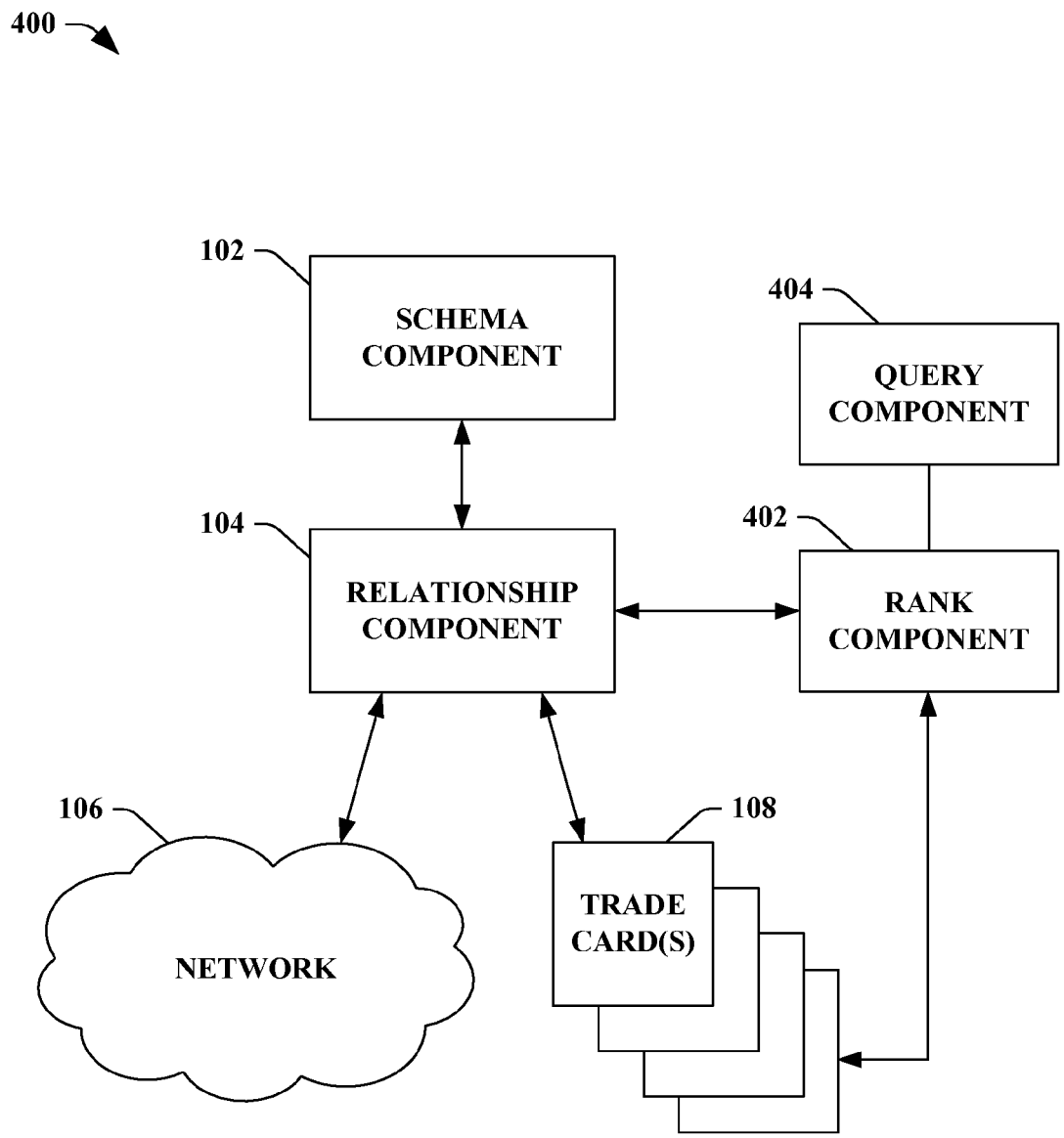
FIG. 4 illustrates a block diagram of an exemplary system that facilitates vetting or querying a trade card in accordance with the subject innovation.

FIG. 4 illustrates a system 400 that facilitates vetting or querying a trade card in accordance with the subject innovation. The system 400 can include a rank component 402 that enables a vetting or ranking for a portion of a trade card 108. In particular, the rank component 402 can implement any suitable ranking from a user, a group, a company, machine, and/or any other suitable entity for a portion of the trade card (e.g., a section of the trade card, an editorial experience, a gadget related to the trade card, an applet related to the trade card, a portion of static data related to the trade card, etc.). For example, a community can be employed in which a peer review for trade cards can be utilized in which such ranking or vetting can be utilized as a search criteria or organizational criteria.

Moreover, the system 400 can include a query component 404. The query component 404 can conduct searches of any suitable data related to the system 400. In other words, the query component 404 can be any suitable search engine that can search trade cards, sources, trade card types, templates, editorial experiences, security settings, history of browsed trade cards, trade card access, trade card vetting, trade card voting/ranking, creator of a trade card, host of a trade card, schema for a trade card, relationship for a trade card, etc. For example, a user can search the system 400 with the query component 404 in order to identify a portion of data (e.g., schema, applet, static data, image, standardized trade card template for a type, etc.) to create a trade card.

Figure 5:
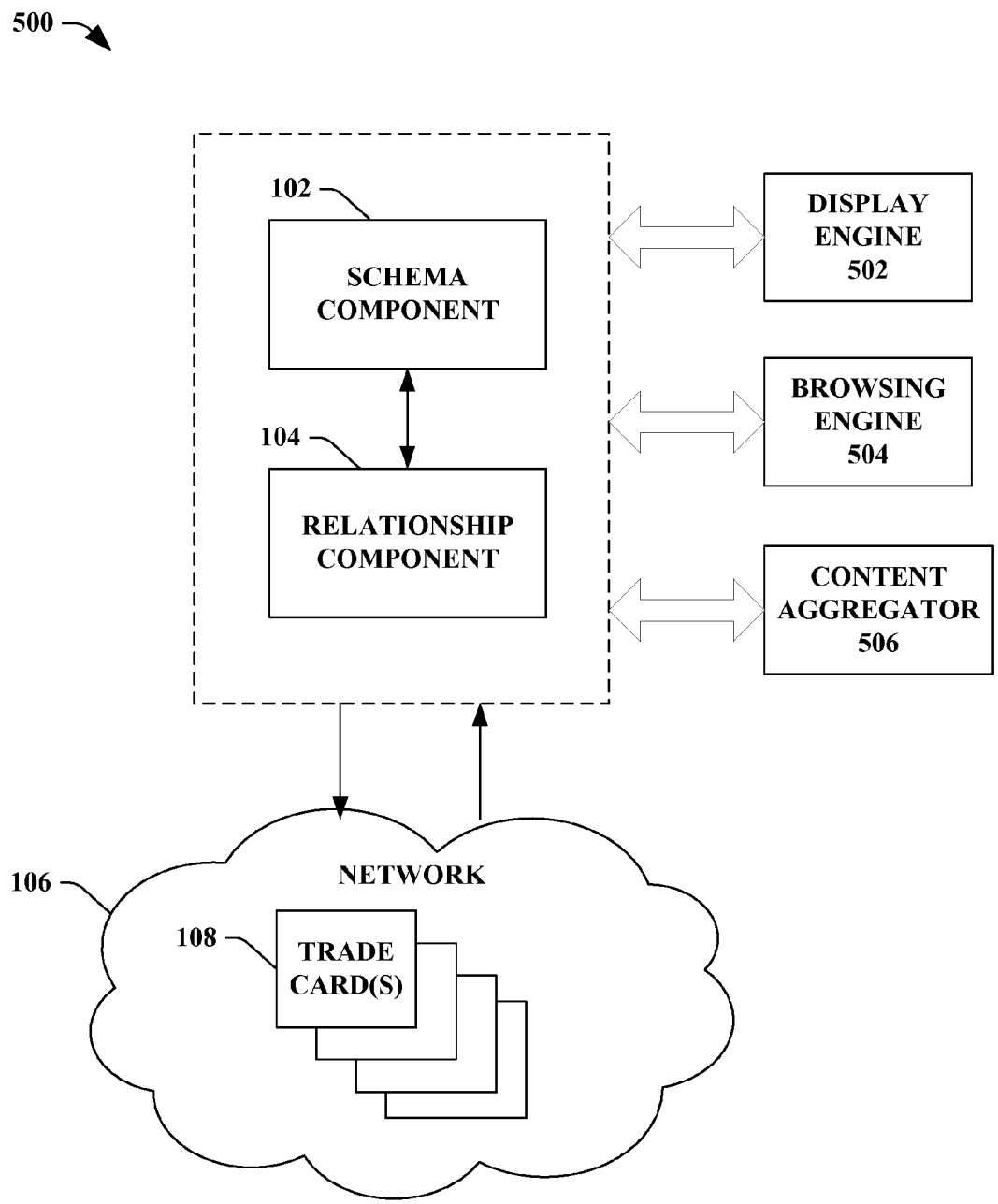
FIG. 5 illustrates a block diagram of exemplary system that facilitates enhancing implementation of a trade card with a display technique, a browse technique, and/or a virtual environment technique.

FIG. 5 illustrates a system 500 that facilities enhancing implementation of a trade card with a display technique, a browse technique, and/or a virtual environment technique. The system 500 can include a display engine 502 that enables seamless pan and/or zoom interaction with any suitable displayed data, wherein such data can include multiple scales or views and one or more resolutions associated therewith. In other words, the display engine 502 can manipulate an initial default view for displayed data by enabling zooming (e.g., zoom in, zoom out, etc.) and/or panning (e.g., pan up, pan down, pan right, pan left, etc.) in which such zoomed or panned views can include various resolution qualities. The display engine 502 enables visual information to be smoothly browsed regardless of the amount of data involved or bandwidth of a network. Moreover, the display engine 502 can be employed with any suitable display or screen (e.g., portable device, cellular device, monitor, plasma television, etc.). The display engine 502 can further provide at least one of the following benefits or enhancements: 1) speed of navigation can be independent of size or number of objects (e.g., data); 2) performance can depend on a ratio of bandwidth to pixels on a screen or display; 3) transitions between views can be smooth; and 4) scaling is near perfect and rapid for screens of any resolution.

For example, an image can be viewed at a default view with a specific resolution. Yet, the display engine 502 can allow the image to be zoomed and/or panned at multiple views or scales (in comparison to the default view) with various resolutions. Thus, a user can zoom in on a portion of the image to get a magnified view at an equal or higher resolution. By enabling the website to be zoomed and/or panned, the image can include virtually limitless space or volume that can be viewed or explored at various scales, levels, or views with each including one or more resolutions. In other words, an image can be viewed at a more granular level while maintaining resolution with smooth transitions independent of pan, zoom, etc. Moreover, a first view may not expose portions of information or data on the image until zoomed or panned upon with the display engine 502.

A browsing engine 504 can also be included with the system 500. The browsing engine 504 can leverage the display engine 502 to implement seamless and smooth panning and/or zooming for any suitable data browsed in connection with at least one of the Internet, a network, a server, a website, a web page, and the like. It is to be appreciated that the browsing engine 504 can be a stand-alone component, incorporated into a browser, utilized with in combination with a browser (e.g., legacy browser via patch or firmware update, software, hardware, etc.), and/or any suitable combination thereof. For example, the browsing engine 504 can be incorporate Internet browsing capabilities such as seamless panning and/or zooming to an existing browser. For example, the browsing engine 504 can leverage the display engine 502 in order to provide enhanced browsing with seamless zoom and/or pan on a website, wherein various scales or views can be exposed by smooth zooming and/or panning.

The system 500 can further include a content aggregator 506 that can collect a plurality of two dimensional (2D) content (e.g., media data, images, video, photographs, metadata, etc.) to create a three dimensional (3D) virtual environment that can be explored (e.g., displaying each image and perspective point). In order to provide a complete 3D environment to a user within the virtual environment, authentic views (e.g., pure views from images) are combined with synthetic views (e.g., interpolations between content such as a blend projected onto the 3D model). For instance, the content aggregator 506 can aggregate a large collection of photos of a place or an object, analyze such photos for similarities, and display such photos in a reconstructed 3D space, depicting how each photo relates to the next. It is to be appreciated that the collected content can be from various locations (e.g., the Internet, local data, remote data, server, network, wirelessly collected data, etc.). For instance, large collections of content (e.g., gigabytes, etc.) can be accessed quickly (e.g., seconds, etc.) in order to view a scene from virtually any angle or perspective. In another example, the content aggregator 506 can identify substantially similar content and zoom in to enlarge and focus on a small detail. The content aggregator 506 can provide at least one of the following: 1) walk or fly through a scene to see content from various angles; 2) seamlessly zoom in or out of content independent of resolution (e.g., megapixels, gigapixels, etc.); 3) locate where content was captured in relation to other content; 4) locate similar content to currently viewed content; and 5) communicate a collection or a particular view of content to an entity (e.g., user, machine, device, component, etc.).

Figure 6:
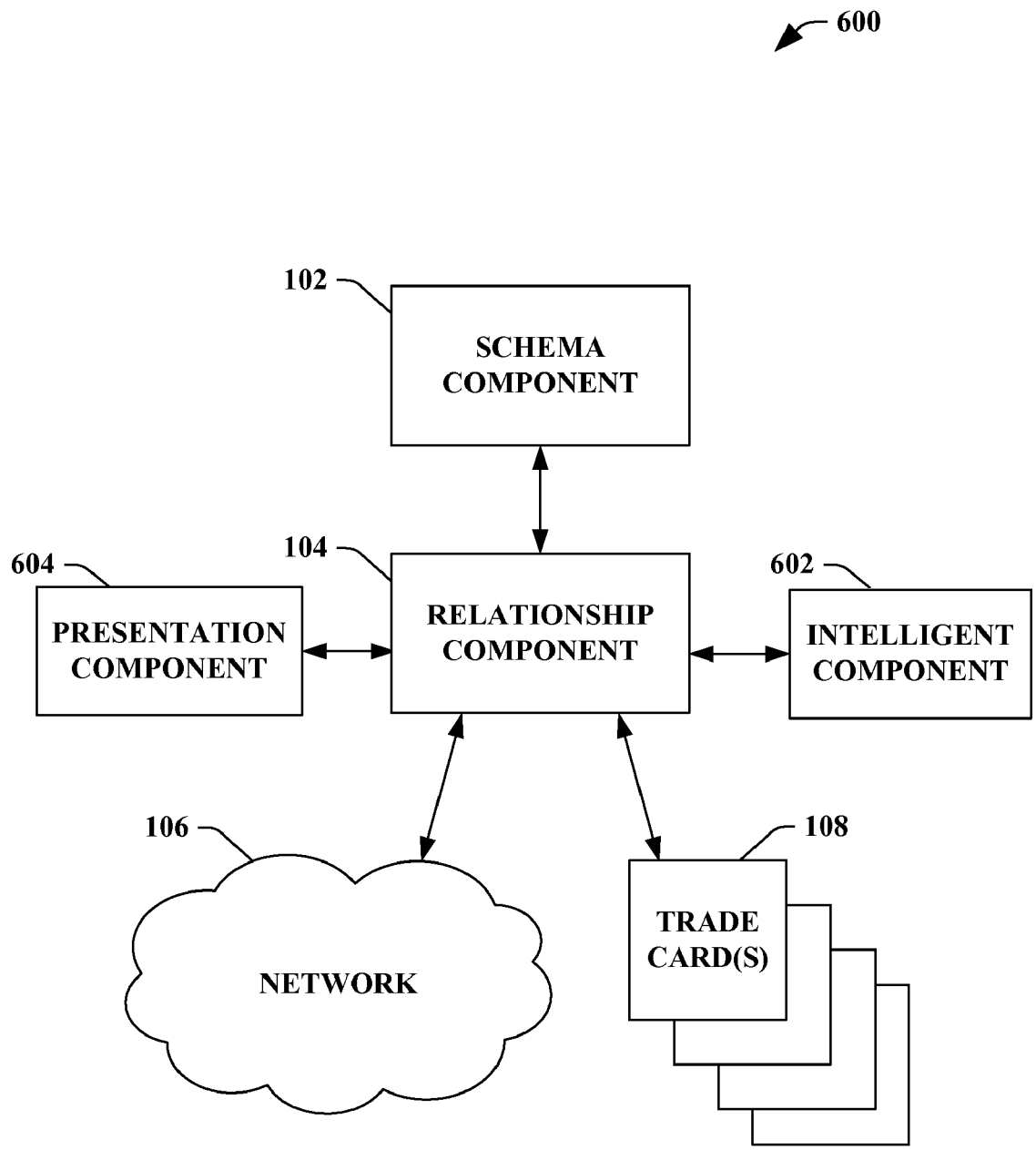
FIG. 6 illustrates a block diagram of an exemplary system that facilitates automatically creating a trade card with identifiable relationships associated therewith.

FIG. 6 illustrates a system 600 that employs intelligence to facilitate automatically creating a trade card with identifiable relationships associated therewith. The system 600 can include the schema component 102, the relationship component 104, the trade card 108, and/or the network 106. It is to be appreciated that the schema component 102, the relationship component 104, the network 106, and/or the trade card 108 can be substantially similar to respective components, networks, and trade cards described in previous figures. The system 600 further includes an intelligent component 602. The intelligent component 602 can be utilized by at least one of the schema component 102 or the relationship component 104 to facilitate creating a trade card and/or identifying trade card relationships. For example, the intelligent component 602 can infer trade card relationships (e.g., indirect, direct, hard link, soft link, etc.), features or characteristics for an automatically or semi-automatically created trade card, a template or type of trade card, a portion of data to incorporate into a trade card, a syndication setting, a exposure setting, a security setting, an exposure setting based on an environment that utilizes the trade card, aesthetic characteristics (e.g., layout, font, size, format, etc.), editorial experiences, resolution data (e.g., scale and corresponding resolution, available views, etc.), display or exposure settings (e.g., configuration for data to display based on target or host environment, display settings for portion of a trade card based on user or machine utilizing such trade card, and/or any other data related to the system 600.

The intelligent component 602 can employ value of information (VOI) computation in order to identify suggestions and/or inferred content for a trade card. For instance, by utilizing VOI computation, the most ideal and/or appropriate suggestions and/or content can be determined for the trade card. In addition, the VOI computation can be utilized to identify relationships in accordance to a specific user (e.g., most applicable or important relationships for a user). Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The schema component 102 or the relationship component 104 can further utilize a presentation component 604 that provides various types of user interfaces to facilitate interaction between a user and any component coupled to at least one of the schema component 102 or the relationship component 104. As depicted, the presentation component 604 is a separate entity that can be utilized with the schema component 102 or the relationship component 104. However, it is to be appreciated that the presentation component 604 and/or similar view components can be incorporated into the schema component 102, incorporated into the relationship component 104, and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into at least one of the schema component 102 or the relationship component 104.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
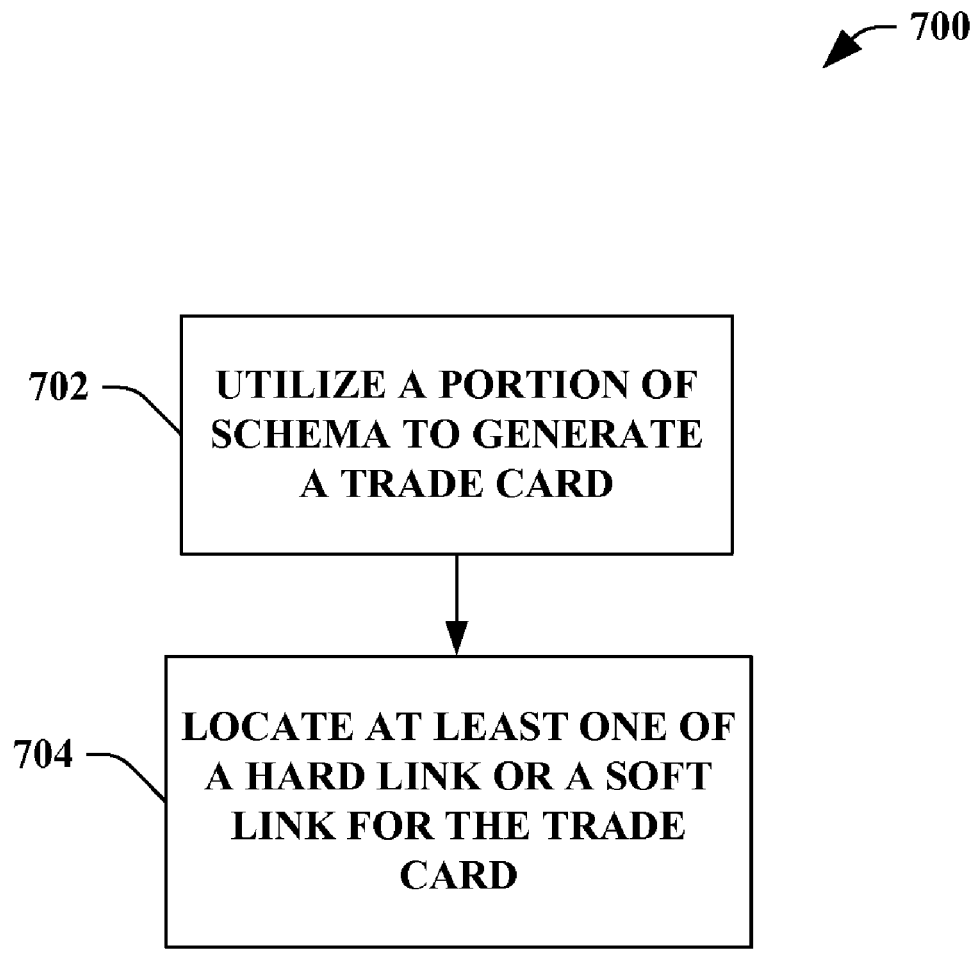
FIG. 7 illustrates an exemplary methodology for identifying relationships for a trade card created with a portion of user-assisted schema.
Figure 8:
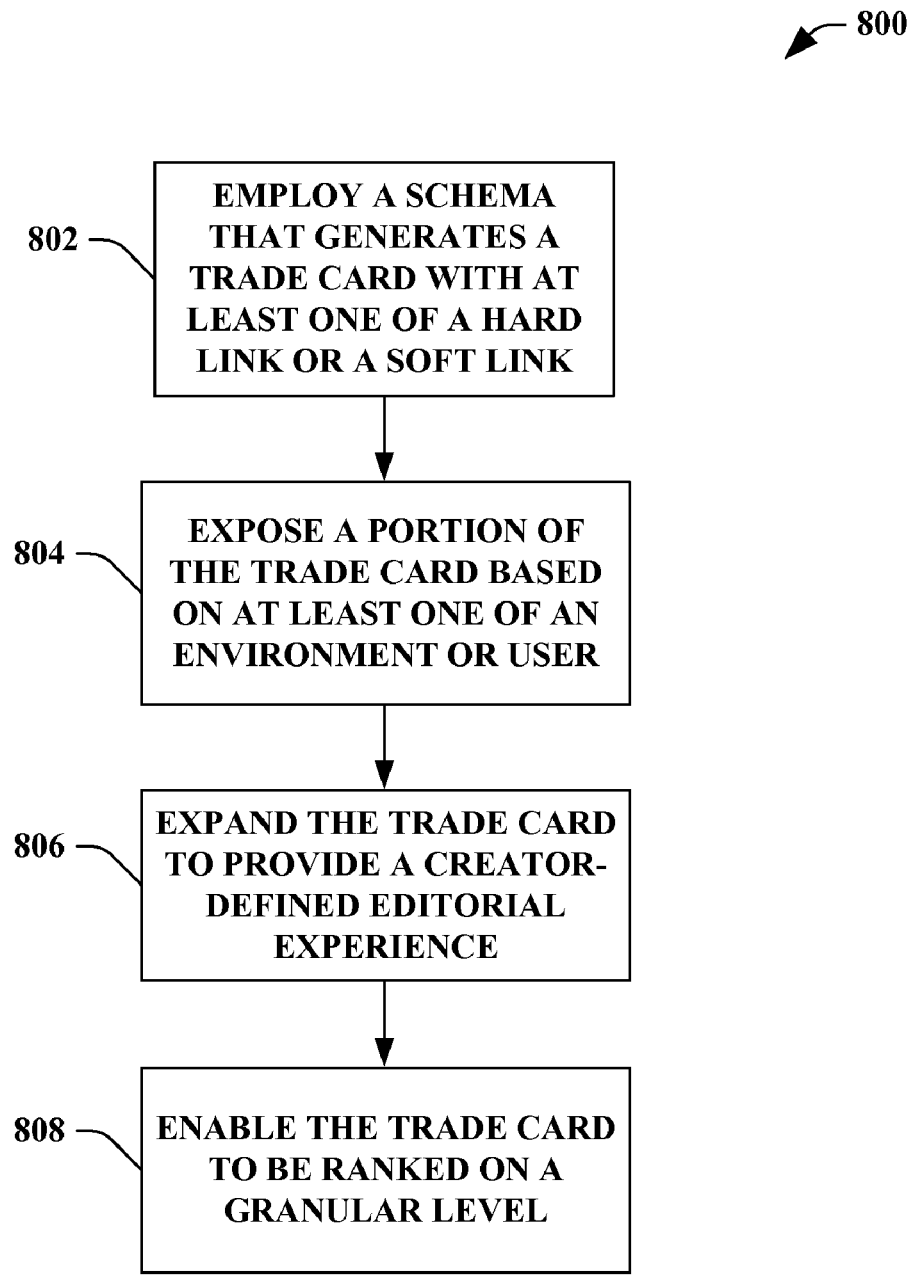
FIG. 8 illustrates an exemplary methodology that facilitates optimizing employment of a user-created trade card.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates identifying relationships for a trade card created with a portion of user-assisted schema. At reference numeral 702, a portion of schema can be utilized to generate a trade card. A trade card can be a summarization of a portion of data, wherein such summarization includes important, essential, and/or key aspects and/or data. For instance, a trade card can be a summary of a web page in which the trade card can include key phrases, dominant images, spec information (e.g., price, details, etc.), contact information, etc. Thus, the trade card is a summarization of important, essential, and/or key aspects and/or data of the web page. Moreover, it is to be appreciated that the trade card can include any suitable data determined to be essential for the distillation of a document or item such as static data, active data, and/or any suitable combination thereof. For example, the trade card can include an image, a gadget, an applet, a real time data feed, etc. The trade card can further be utilized in any suitable environment, in any suitable platform, on any suitable device, etc. In another example, the trade card can include granular layers or views in which a particular portion of data can be displayed based at least in part upon an environment that will display or utilize such trade card. In another example, a particular portion of data on a trade card can be displayed based upon a specific user or machine displaying or utilizing the trade card.

The portion of schema can enable an automatic or semi-automatic creation of a trade card. For example, a trade card can be created based upon a template or the type of trade card (e.g., content, topic, subject, categorization of the trade card, etc.). In another example, a portion of schema can be utilized to semi-automatically create a trade card in which a user can provide additions, manipulations, and/or other features/settings. In general, the portion of schema can provide automatic or semi-automatic assistance (with or without user-review) for at least one of aesthetic characteristics (e.g., layout, font, size, format, etc.), populated data (e.g., graphics, imagery, video, audio, web links, websites, etc.), derived source data (e.g., editorial experiences, expansion data, etc.), resolution data (e.g., scale and corresponding resolution, available views, available scales, etc.), relationships (e.g., direct links, indirect links, etc.), security settings (e.g., permissions for viewing, etc.), display settings (e.g., configuration for data to display based on target or host environment, display settings for portion of a trade card based on user or machine utilizing such trade card, etc.), and/or any other suitable data associated with creating a trade card as discussed in the subject innovation.

At reference numeral 704, at least one of a hard link or a soft link for the trade card can be located. It is to be appreciated that the hard link or the soft link can be associated with a user-created trade card (e.g., utilizing the schema) or any other suitable trade card. It is to be appreciated that any suitable data related to the trade card can be evaluated in order to locate implicit, explicit, direct, indirect, hard link, soft link, etc. relationships and/or affiliations. Moreover, a network can be evaluated or searched in order to identify relationships for the trade card. For example, a search on a trade card can identify direct and/or indirect links within a network including at least one disparate trade card. It is to be appreciated that a hard link (e.g., a direct relationship) can refer to a source that derived the trade card (e.g., hyperlink, website, user, network, server, company, etc.), whereas a soft link (e.g., an indirect relationship) can refer to a substantially similar trade card (e.g., trade card A includes data that correlates to data associated with trade card B) with correlating data or common criteria. In an aspect of the subject innovation, the relationships and/or links can be aggregated into a trade card data store.

FIG. 8 illustrates a method 800 for optimizing employment of a user-created trade card. At reference numeral 802, a schema can be employed to generate a trade card with at least one of a hard link or a soft link. The trade card can be any suitable summarization or distillation of data that is representative of any suitable content such as, but not limited to, a document, an item such as, a website, a good, a service, a user, a network, a company, an enterprise, a home, a group of users, etc. For example, information related to a cellular device can be distilled into a trade card including images, key terms, important tags, web links, specification data, etc. In addition, such trade card can include direct links such as a creator or source that the trade card is derived (e.g., a user, a company, a manufacturer, etc.) as well as indirect links such as disparate trade cards with related information or data (e.g., a trade card representative of a manufacture that sells the particular cellular device).

At reference numeral 804, a portion of the trade card can be exposed based at least in part upon an environment or user. In particular, the trade card can include granular portions of data, wherein portions of the trade card can include various scales, views, and/or resolutions. Thus, a trade card section or portion can be exposed or displayed based at least in part upon the environment that utilizes or accesses such trade card. For example, a portion of a trade card can be displayed for a mobile device (e.g., based on limited connectivity or resources), whereas a disparate portion of the trade card can be displayed for a desktop machine. In addition, the granularity of the trade card exposed can be dependent upon a user accessing such trade card. In other words, a first portion of a trade card can be available to a first user, but such first portion of the trade card may not be available to a second user.

At reference numeral 806, the trade card can be expanded in order to provide a creator-defined editorial experience. The editorial experience can be selected by a creator or origin of the trade card. For instance, the trade card can include a collection of data grouped together by a creator of the trade card (e.g., the editorial experience) in order to convey a particular message, information, or thought in connection with the trade card. As discussed, the editorial experience can be any suitable collection of data such as, but not limited to, a portion of image, a portion of audio, a portion of text, a portion of video, and/or any other suitable data. It is to be appreciated that the editorial experience can include any suitable data identified by the trade card creator. Moreover, the editorial experience can be specific in regards to the data displayed or provided based on a user or an environment that accesses the trade card and respective editorial experience.

At reference numeral 808, the trade card can be enabled to be ranked on a granular level. In other words, a portion of the trade card can be ranked or vetted by a user or a networked community. As stated, the trade card can include various levels, views, scales, and/or resolutions (e.g., granularity, etc.). It is to be appreciated that a ranking or vetting technique can be employed for the portions of a trade card. Furthermore, such vetting or ranking can be a community or network including users, entities, (e.g., companies, third-parties, services, a group of users, a forum, a web site, a social network, etc.), machines (e.g., automated ranking or vetting, etc.), and the like.

Figure 9:
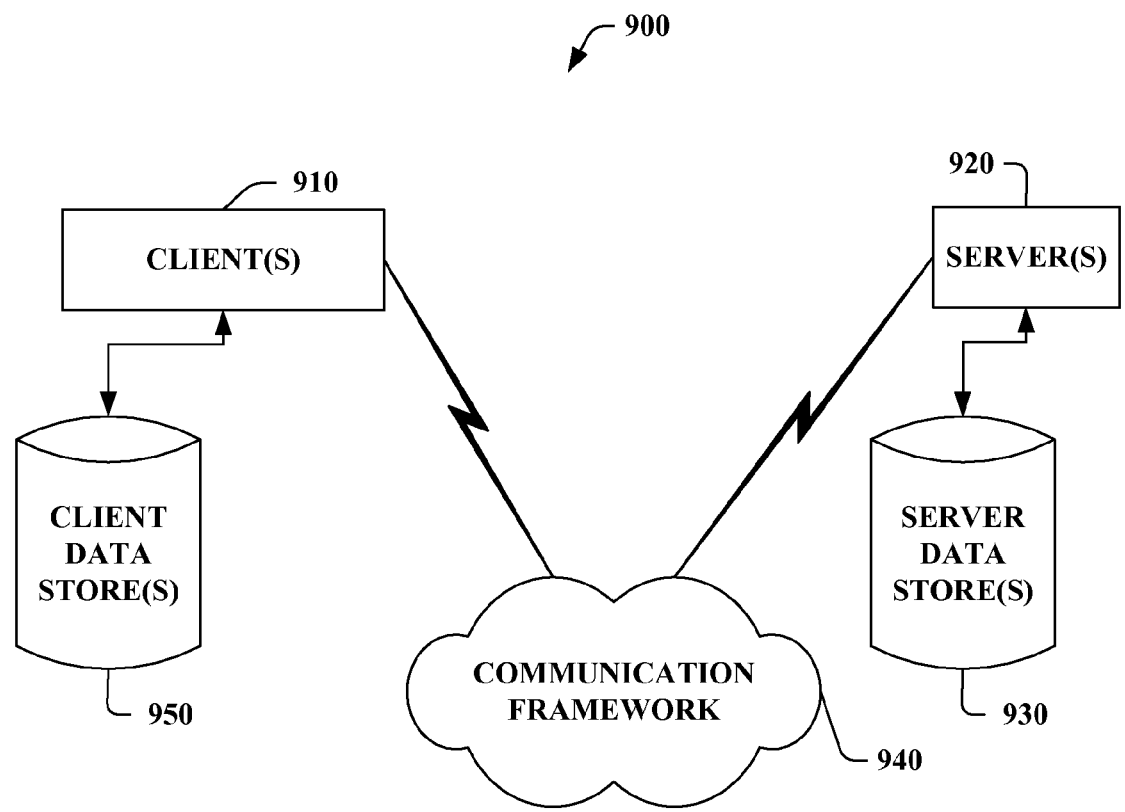
FIG. 9 illustrates an exemplary networking environment, wherein the novel aspects of the claimed subject matter can be employed.
Figure 10:
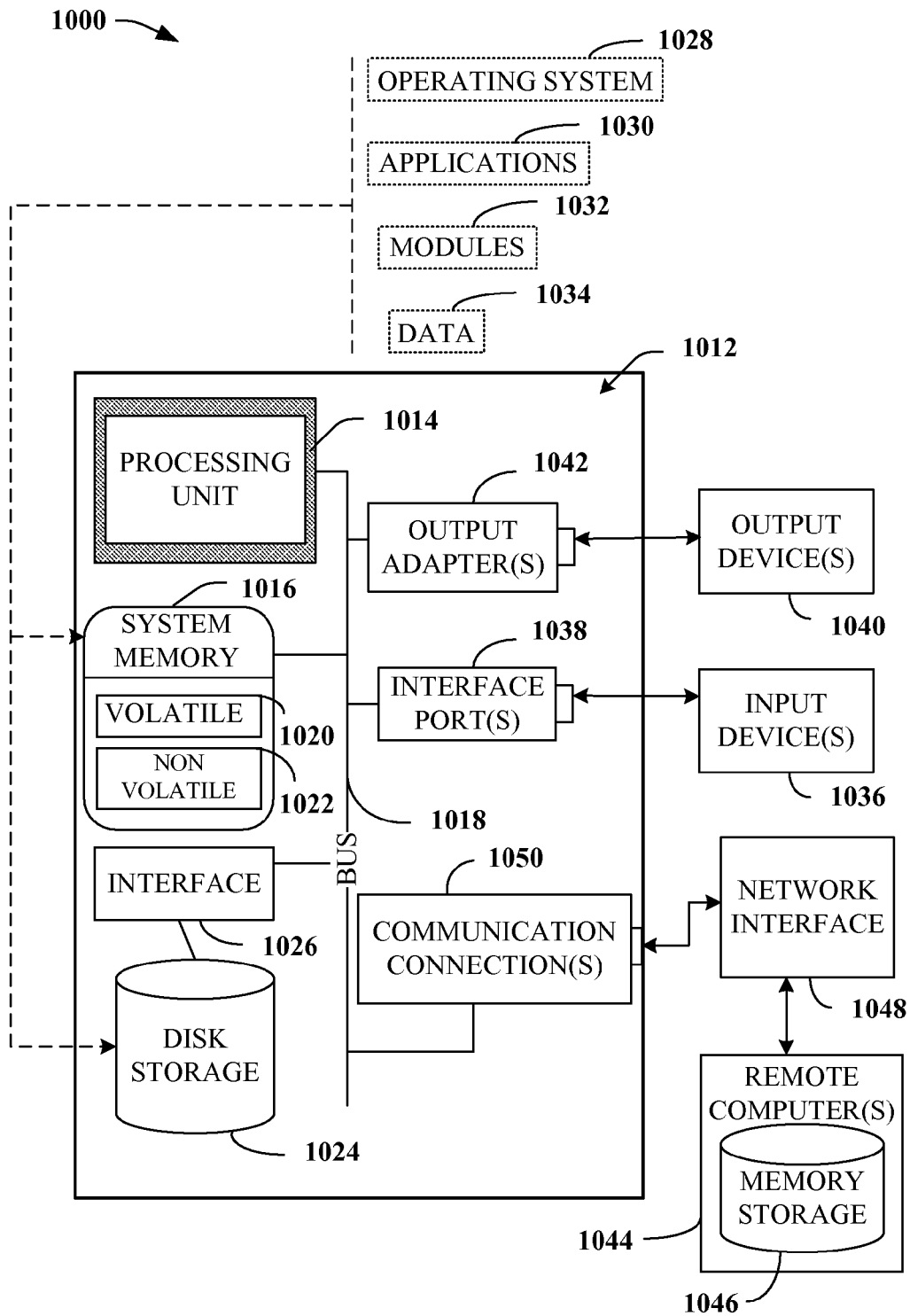
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a trade card can be created utilizing a schema component and an affiliation (e.g., a relationship, connection, etc.) can be identified by a relationship component, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computer-implemented system embodied on a computer-readable storage medium and configured to facilitate identifying relationships between two or more trade cards, the computer-implemented system comprising:
    a schema component configured to implement a portion of schema to create a trade card with first document-specific data configured to represent a distillation of a document,
        wherein the portion of schema is configured to create the trade card without user assistance, and
        wherein the trade card includes an editorial experience that is a collection of data defined by an owner of the trade card, wherein the collection of data is a video including at least one image of the owner of the trade card;
    an edit component configured to automatically identify a type of the trade card to create based on content determined to be in the document; and
    a relationship component configured to identify at least one of a hard link or a soft link associated with the trade card in connection with at least one of a network or one or more trade cards, wherein the hard link is a link to a source that derived the trade card and the soft link is a link to a disparate trade card having at least a portion of second document-specific data that is substantially similar to the first document-specific data of the trade card.

2. The computer-implemented system of claim 1, wherein the trade card includes at least one of static data or active data.

3. The computer-implemented system of claim 1, wherein the trade card is configured to incorporate at least one of a portion of a graphic, a portion of audio, a portion of video, a portion of an image, an applet, a gadget, or a real-time data update.

4. The computer-implemented system of claim 1, wherein the trade card is granular with one or more sections of data, wherein each section includes at least one of a view, a scale, or a resolution.

5. The computer-implemented system of claim 4, wherein the trade card is configured to be universally implemented in an environment independent of a format of the environment, wherein the environment is at least one of a desktop computer, a component, a machine, a machine with a computer operating system, a media device, a portable media player, a cellular device, a portable digital assistant (PDA), a gaming device, a laptop, a web-browsing device, a gaming console, a portable gaming device, a mobile device, a portion of hardware, a portion of software, a smartphone, a wireless device, or a third-party service.

6. The computer-implemented system of claim 5, wherein at least one section of data related to the trade card is exposed based, at least, in part, upon one of the following: the environment accessing the trade card or a user accessing the trade card.

7. The computer-implemented system of claim 1, wherein the document is at least one of an item, a website, a good, a service, a user, a network, a company, an enterprise, a home, or a group of users.

8. The computer-implemented system of claim 1, wherein the source that derived the trade card is an entity, and the entity is at least one of a corporation, a business, a company, a machine, a website, or a web page.

9. The computer-implemented system of claim 1, wherein the portion of schema is configured to enable creation of at least a portion of the trade card, wherein the at least a portion of the trade card includes at least one of one or more aesthetic characteristics, a layout, a font, a size, a format, a portion of populated data, a portion of data related to the source, an editorial experience, a portion of resolution data, a relationship, a security setting, or a display setting.

10. The computer-implemented system of claim 1, wherein the edit component is further configured to implement a preference for a portion of the trade card, wherein the preference is defined by an entity configured to create the trade card.

11. The computer-implemented system of claim 10, wherein the edit component is further configured to implement at least one feature for the portion of the trade card, wherein the feature is at least one of: a portion of data to include with the trade card, a syndication of the portion of the trade card, a portion of editorial experience data, the source, a relationship, a link, a security setting, an exposure for the portion of the trade card, an aesthetic characteristic, a portion of resolution data, or a display setting.

12. The computer-implemented system of claim 1, further comprising:
a syndication component configured to utilize a portion of the trade card as a web feed to a host, wherein the host is at least one of a website, the disparate trade card, a network, a server, a user, a web address, an email address, or a device.

13. The computer-implemented system of claim 1, further comprising:
a rank component configured to collect a ranking associated with a portion of the trade card, wherein the rank component is configured to receive the ranking from at least one of a network, a community, a user, a group of users, a machine, a forum, a website, a collection of entities, business, a company, a third-party service, or a social network.

14. A computer-implemented method that facilitates creating a portion of a trade card that is a summarization of data, the computer-implemented method comprising:
utilize a portion of schema to automatically generate the portion of the trade card, wherein automatically generating the portion of the trade card is performed without receiving an input from a user,
wherein the trade card is granular with one or more sections of data, and one or more of the sections of data includes at least one of a view, a scale, or a resolution, and
wherein the trade card includes an editorial experience that is a collection of data defined by an owner of the trade card, wherein the collection of data is a video including at least one image of the owner of the trade card;
automatically identify a type of the trade card to create based on the data; and
locate at least one of a hard link or a soft link for the trade card, wherein the hard link is a link to a source that derived the portion of the trade card and the soft link is a link to a disparate trade card having a portion of data that correlates to the summarization of data.

15. The computer-implemented method of claim 14, further comprising:
employing the processor to execute the computer-executable instructions that, when executed by the processor, also cause the processor to:
expose the portion of the trade card based, at least, in part, upon at least one of an environment that accesses the trade card or a user that accesses the trade card; and
expand the trade card to provide a creator-defined editorial experience based, at least, in part, upon at least one of the environment that accesses the trade card or the user that accesses the trade card.

16. The computer-implemented method of claim 14, further comprising:
employing the processor to execute the computer-executable instructions that, when executed by the processor, also cause the processor to:
provide a web syndication of the portion of the trade card; and
enable the trade card to be ranked on a granular level.

17. The computer-implemented method of claim 14, wherein the collection of data is a collection of audio data.

18. A computer-readable storage medium storing computer-executable instructions for performing:
implementing a portion of schema to create a trade card that represents, with first document-specific data, a distillation of a document,
wherein the portion of schema is configured to create the trade card without receiving information from a user, and
wherein the trade card includes an editorial experience that is a collection of data defined by an owner of the trade card, wherein the collection of data is a video including at least one image of the owner of the trade card and detailing information about products or services offered in connection with the trade card;
automatically identifying a type of the trade card to create based on content determined to be in the document; and
identifying at least one of a hard link or a soft link associated with the trade card in connection with at least one of a network or one or more trade cards, wherein the hard link is a link to a source that derived the trade card and the soft link is a link to a disparate trade card with at least a portion of second document-specific data that is substantially similar to the first document-specific data.

* * * * *